United States Patent [19]

Tonazzi

[11] Patent Number: 5,786,572
[45] Date of Patent: Jul. 28, 1998

[54] DEVICE FOR HEATING THE INTERNAL SURFACE OF THE OPEN END OF PLASTIC TUBLAR CONTAINERS

[75] Inventor: Guido Bruno Tonazzi, Pregassona, Switzerland

[73] Assignee: Vittorio Tonazzi & C.S.r.l., Italy

[21] Appl. No.: 385,754

[22] Filed: Feb. 8, 1995

[30] Foreign Application Priority Data

Feb. 15, 1994 [IT] Italy ................................ MI94A0273

[51] Int. Cl.⁶ ........................................ H05B 3/06
[52] U.S. Cl. ........................ 219/523; 219/243; 219/535; 156/308.4
[58] Field of Search .................. 219/523, 524, 219/200–201, 535, 385, 343; 100/93 R, 93 P, 92; 264/404; 425/174, 174.6, 373.7, 374.8–374.9, 477, 479; 156/217, 308.4, 309.9, 322

[56] References Cited

U.S. PATENT DOCUMENTS

| | | | |
|---|---|---|---|
| 2,715,087 | 8/1955 | Barradas | 156/308.4 |
| 2,926,474 | 3/1960 | Morrison | 53/373 |
| 3,140,571 | 7/1964 | Dorper et al. | 53/477 |
| 3,691,267 | 9/1972 | Takehara | 53/140 |
| 3,765,144 | 10/1973 | Schiesser | 53/412 |
| 4,394,204 | 7/1983 | Hutcheson | 156/275.1 |
| 4,511,426 | 4/1985 | Linner | 156/497 |
| 4,596,110 | 6/1986 | Weiler | 53/410 |
| 4,671,763 | 6/1987 | Weiler | 425/525 |

FOREIGN PATENT DOCUMENTS 2190323 11/1987 United Kingdom.

*Primary Examiner*—Tu B. Hoang
*Attorney, Agent, or Firm*—Ladas & Parry

[57] ABSTRACT

Device for heating the internal surface of the open end of plastic tubular containers, consisting of a heating head (1) which has a cross-section corresponding to the shape of the tubular container and can be coaxially inserted so as to make contact, inside the open end of the tubular container (3) itself, along a section corresponding to the section (3a) to be softened internally, a heating head (1) being provided internally with electrical heating resistances (2), there also being provided a device (3) for pressing the tube against the heating head (1) during heating so that the heat is transmitted to the internal surface of the container of direct-contact conduction.

10 Claims, 3 Drawing Sheets a)

b)

DEVICE FOR HEATING THE INTERNAL SURFACE OF THE OPEN END OF PLASTIC TUBLAR CONTAINERS

BACKGROUND OF THE INVENTION

The present invention relates to a device for heating the internal surface of the open end of tubular containers made of plastic or laminated plastic, so as to allow softening of the material of the end itself for subsequent pressure-sealing.

Said tubular containers, flasks or the like, normally consist of tubes made of plastic or plastic-covered laminated metal having one end closed by means of a cap or the like, for containing alimentary, cosmetic, pharmaceutical and similar products.

As is known, tubes with a cap for containing alimentary, cosmetic, pharmaceutical and similar products are filled, by means of automatic filling machines, via the open end.

The said open end of the tubes is then closed and hermetically sealed after filling by means of various techniques including that performed by high-frequency welding, ultrasonic welding or welding by means of jaws which are heated and brought into contact with the external surface of the end of the body to be sealed.

In other cases, closing of said tubular ends is performed by introducing, inside the cylindrical tube, a suitable nozzle through which hot air is forced and directed towards the internal wall of the end of the tube, causing partial melting of the internal surface of the same.

Subsequently, with the aid of suitable clamping grippers, sealing of the end directed transversely with respect to the longitudinal axis of the body itself is performed.

All of the welding processes which perform sealing of the plastic tube body by means of heat applied from the outside and directed towards the internal wall of the tube also give rise to softening of the external walls which causes, during closing performed by means of pressing, transverse deformation of the seal with respect to the diametral dimension of the tube.

In practice, it has also been noted that the high-frequency welding technique, in addition to being complex and costly, can be applied exclusively to laminated metal and plastic tubes.

Also, the processes which envisage welding using hot air directed against the internal wall of the open end of the tube via nozzles or the like may have the serious drawback of allowing part of the hot air to pass in the direction of the product contained in the tube, even where protective elements are present, which may cause alteration of the product itself.

The technical problem which is therefore posed is that of providing a device for heating the internal end zone of plastic tubular containers structured so as to overcome the drawbacks associated with the various known devices.

Within the scope of this problem, the main aim is that of performing heating of the internal surface of the end of the tube in a uniform and controlled manner and without the need for cooling of the external surface of the tube corresponding to the internal heated surface, with obvious advantages both of a practical and economic nature.

A further aim of the invention is that of providing a heating device able to transfer the heat directly by means of contact with the internal cylindrical wall of the end of the tube to be sealed, so as to allow the required softening mainly of the internal zone of the end and hence avoid the danger of deformation of the tubular body.

These and further aims, which can be understood more clearly from the description which follows, are obtained by means of a device for heating the internal surface of the open end of plastic or laminated-plastic tubular containers, consisting of a heating head which has a cross-section corresponding to the shape of the tubular container and can be coaxially inserted so as to make contact, inside the open end of the tubular container itself, along a section corresponding to the section to be softened internally, said heating head being provided internally with electrical heating resistances and being associated with means for pressing the tube against the heating head during heating so that the heat is transmitted to the internal surface of the container by means of direct-contact conduction.

According to a preferred embodiment, said pressing means, which during entry of the heating head do not act on the tube, substantially consist of a rigid annular body kept coaxially fixed to the end of the container undergoing heating and provided with ducts respectively for supplying and discharging a fluid supplied under pressure, said holes emerging in an annular seat accommodating a sheath made of elastically yielding material, such as natural or synthetic rubber or the like, shaped so as to be able to be held against the annular body by counter-plates integral with the body itself so that the introduction of a fluid under pressure into the annular seat causes radial expansion of the sheath in the direction of the longitudinal axis of the tube after the heating and centring device has been introduced into the tube which is thus compressed around the heating head after entry of the latter into the tube.

According to a further embodiment said pressing means consist of at least one pair of jaws mounted on arms rotating about an axis fixed with respect to the longitudinal axis of the container; furthermore, the end part of said heating head may be formed by means of interchangeable threaded rings which have different external diameters and can be coupled to the end of the heating head by suitable means.

Further characteristic features and advantages of the present invention will emerge more clearly from the following detailed description, given with reference to the enclosed drawings provided solely by way of example, in which:

DESCRIPTION OF THE PREFERRED EMBODIMENTS

Figure 1:
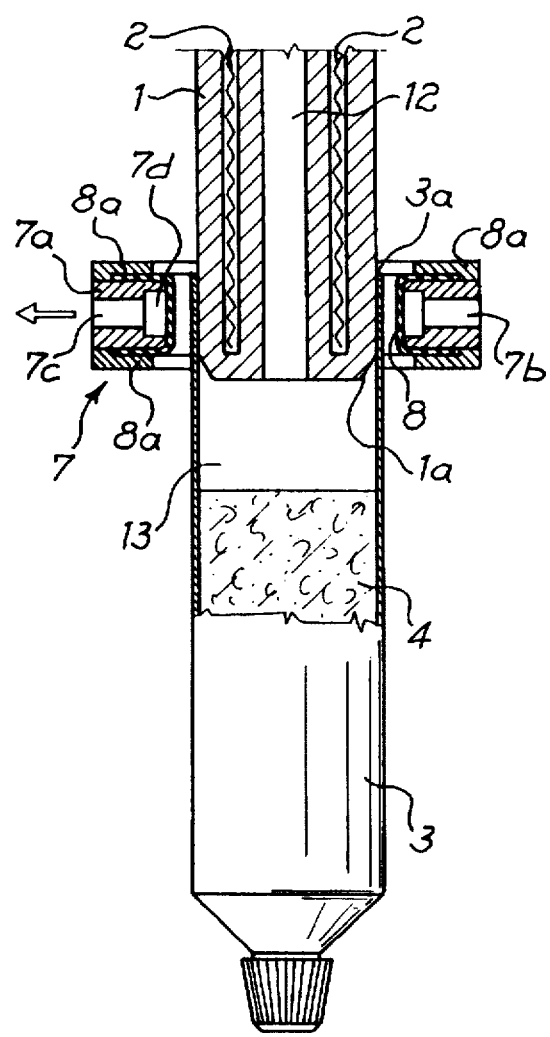
FIG. 1 shows a diagrammatic longitudinal section through the heating device according to the present invention at the start of the cycle.
Figure 3:
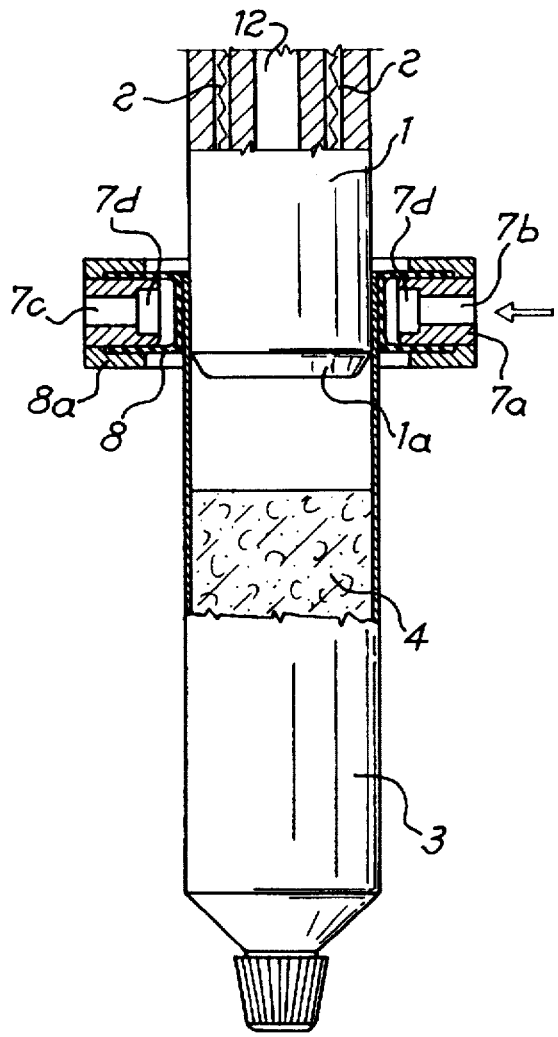
FIG. 3 shows a partially sectioned view of the device during heating of the internal surface of the tubular container and the pressing device made of elastically yielding material.
Figure 2:
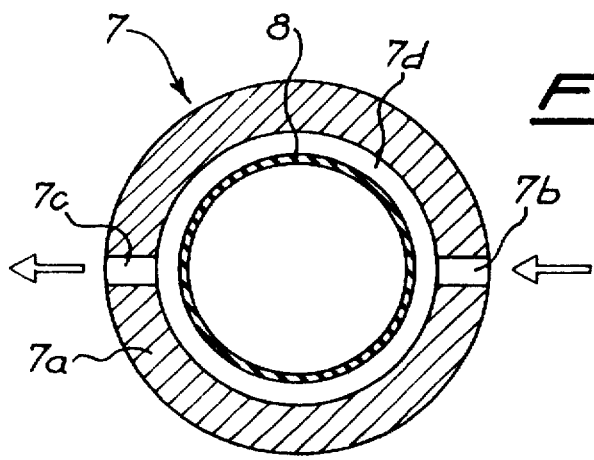
FIG. 2 shows a cross-section through the pressing group.

With particular reference to FIGS. 1, 2 and 3, the heating device which is the subject of the present invention consists of a heating head 1 provided internally with electrical resistances 2 positioned so as to heat uniformly the peripheral zone of the said head which in the example shown in the figure has a cylindrical shape, but can assume a shape corresponding to that of the tubular container.

Said heating head 1 is mounted on an automatic machine known per se and therefore not illustrated and can be translated axially with predefined stops, by means of known technical means, so as to be able to be axially inserted inside the open end 3a of a tubular container, flask or the like 3 made of plastic or plastic-coated laminated metal, already filled with product 4; said tube 3 is supported vertically in an upturned position by a rotating platform or the like, not shown, of the aforementioned automatic sealing machines.

The bottom end of said cylindrical body 1 is inserted inside the open end 3a of said tube 3 along a section substantially corresponding to the sole end part to be softened so as to perform subsequently sealing by means of grippers which effect a compression weld along a line transverse with respect to the axis of the tube.

The free end 1a of the heating head 1 has a substantially conical shape so as to facilitate entry, into the tube 3, of its own cylindrical section, the diameter of which is such as to allow entry thereof into the open end of said tube 3, effecting at the same time centring of the latter around its own surface and the necessary contact for transmission of the heat.

In order to ensure perfect contact between the end 3a of the tube and the end of the heating head 1 during the heating stage, a pressing group, indicated by 7 in FIGS. 1 and 2, is coaxially positioned outside the tube 3, said group consisting of a rigid annular body 7a kept fixed coaxially to the end 3a of the container undergoing heating and provided with holes 7b and 7c respectively for supplying and discharging a fluid supplied under pressure; said holes emerge in an annular seat 7d accommodating a sheath 8 made of elastically yielding material such as natural or synthetic rubber or the like shaped so as to be able to held against the annular body 7a by counter-plates 8a integral with the body 7a itself.

In this way the introduction of a fluid under pressure into the annular seat 7d via the supply hole 7b causes radial expansion of the sheath 8 (FIG. 3) in the direction of the longitudinal axis of the tube 3 which is thus compressed around the heating head 1, favouring the uniform transmission of heat to the internal surface of the tube.

At the end of the heating stage, the fluid under pressure is discharged via the hole 7c causing the elastic retraction of the sheath 8 into its seat; in this way the tubular container 3 can be freed from engagement with the heating head and conveyed away for subsequent sealing.

Figure 4:
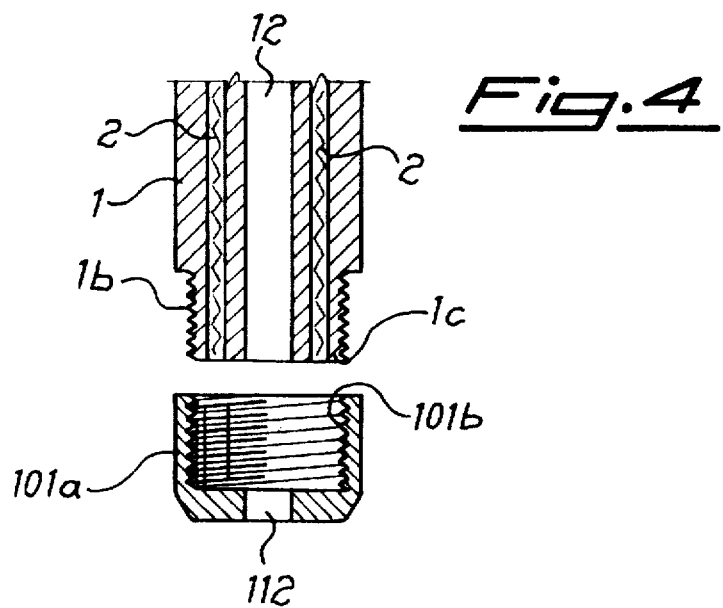
FIG. 4 shows a constructional variant of the heating head.

According to an alternative embodiment of the device according to the invention, illustrated in FIG. 4, the end of the heating head 1 which is to be inserted inside the section 3a of tube 3 to be softened, may be constructed in an interchangeable manner using separate threaded rings 101a provided with a female thread 101b which can be coupled to a corresponding thread 1b formed on a stud 1c of reduced diameter formed as one piece on the end of the cylindrical body 1.

Said threaded rings 101a must obviously have an external diameter corresponding to the internal diameter of the tube to be heated, it being obvious that in this way it is possible to soften also tubes with a greatly varying internal diameter by simply changing the threaded ring 101a.

Figure 5:
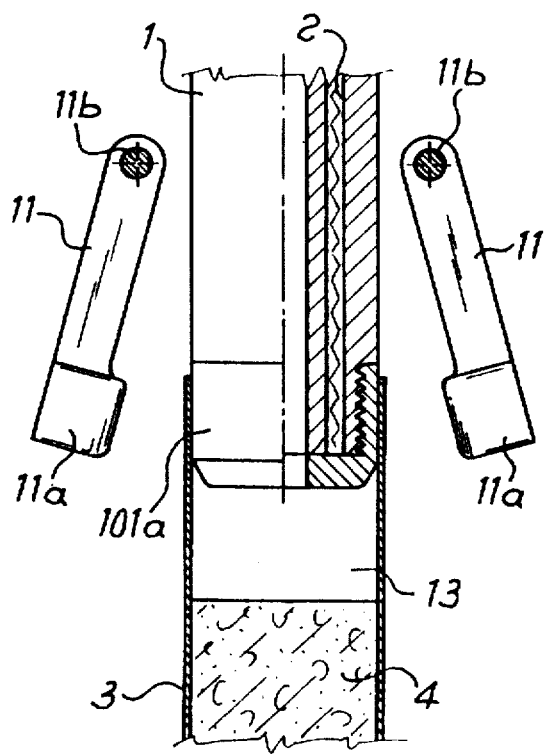
FIGS. 5 and 6 show a constructional variant of the pressing group during the heating cycle.
Figure 6:
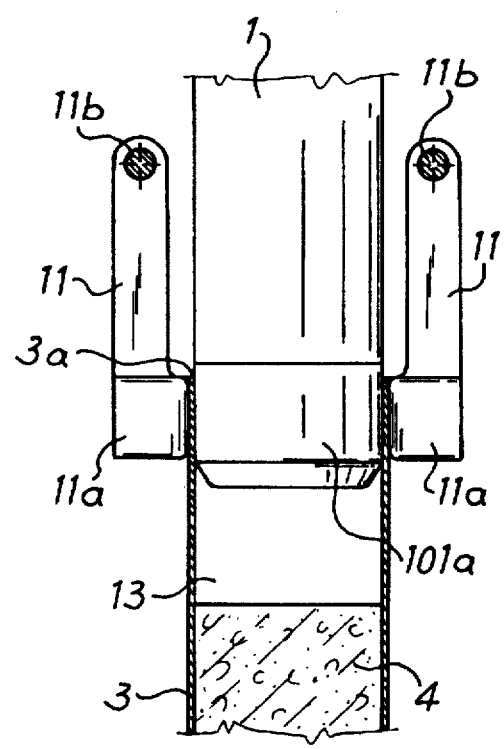

Again in order to limit the need for re-equipping the machine whenever there is a variation in the diameters of the tube, it is also envisaged that said pressing group 7 may be constructed by means of two semi-cylindrical jaws 11a mounted on arms 11 rotating about an axis 11b which is fixed with respect to the tube as illustrated in FIGS. 5 and 6.

The semi-cylindrical part 11a is brought into contact and then pressed against the end part 3a of the tube during the heating stage; the handling means are of the known type and therefore not illustrated in detail.

Figure 7:
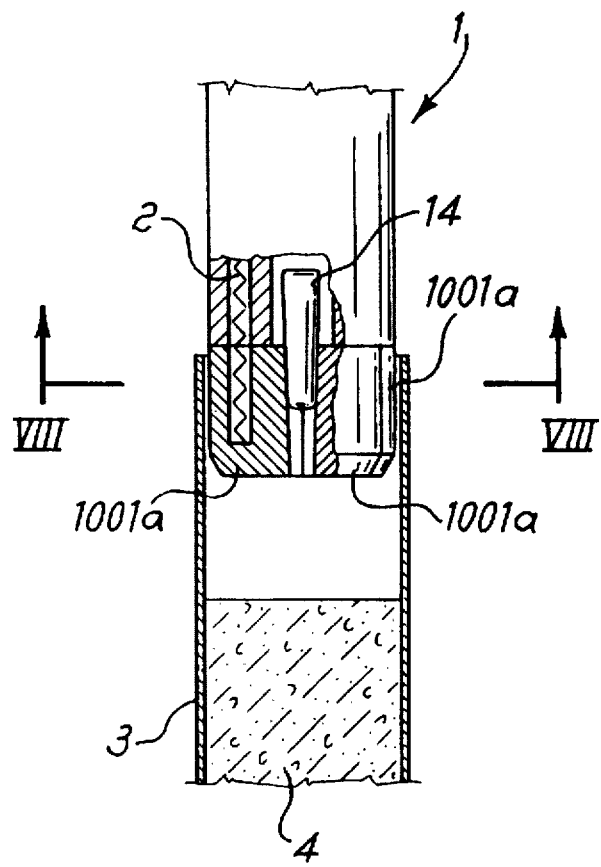
FIG. 7 shows a further constructional variant of the heating head.

FIG. 7 illustrates a further embodiment of the heating head 1 according to the invention, according to which the end of the head which is to be inserted into the tube 3 consists of circle segments 1001a each of which has the resistance 2 passing through it in the axial direction; the circle segments 1001a are movable in the radial direction by the thrusting action of a conical spigot 14 which in turn can be actuated in the axial direction via known means not illustrated and which opposes the recall action of further— for example elastic—means known per se and therefore also not illustrated, acting so as to bring the circle segments back into their initial condition where they have a smaller diameter.

The axial movement of the spigot 14 therefore causes the mutual movement of the said segments towards/away from the internal surface of the tube.

Figure 8A:
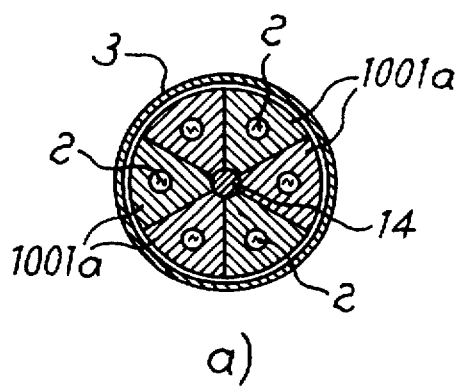
FIGS. 8a and 8b show a section along the plane indicated by VIII—VIII in FIG. 7 during insertion into the tube and heating, respectively.
Figure 8B:
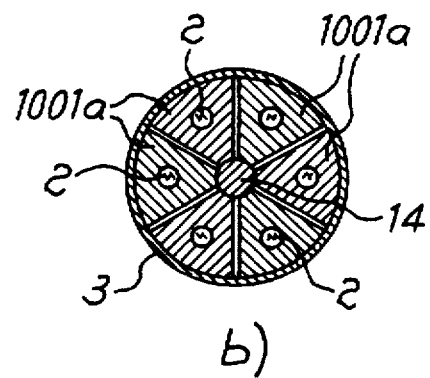

As illustrated in FIGS. 8a, 8b, the free end of the heating head has the spigot 14 raised and segments 1001a normally in contact with each other along the respective radial surfaces so as to allow easy insertion/removal of the end itself into/from the tube 3 (FIG. 8a), while during the heating stage the spigot 14 is lowered causing the said movement of the segments 1001a away from each other and contact of their external circumferential surfaces with the internal surface of the tube 3 so as to achieve softening of the latter (FIG. 8b).

The embodiment described may in turn be completed or not by external opposition means 7, 11.

Finally, a through-duct 12 may be coaxially formed inside the heating head 1, said through-duct being suitable for allowing the introduction, under a slight pressure, of an inert gas into the zone 13 between the bottom of cylindrical body and the surface of the product 4, this making it possible to avoid any transmission of heat to the product itself during the heating stage.

The duct 12 also serves as a vent for the air contained in the space between the end of the head 1 and the surface of the product 4 during introduction of the head 1 into the container 3.

At the end of heating, welding of the softened end 3a of the tube is performed by means of grippers arranged in succession on an automatic machine known per se and hence neither shown nor described.

With the device described above in some of its preferred practical embodiments it is possible to achieve the preset aims and advantages with much lower plant costs compared to plants using hot air or high-frequency and ultrasonic welding, in particular on account of the ease of controlling the softening temperature which can be reached without the need for supplying excess heat typical of contactless heat transmission systems; consequently the reduction in the quantity of heat transmitted also makes it possible to avoid the need for cooling of the external surface of the tube during heating of the internal surface.

I claim:

1. Device for heating an internal surface of an open end of a plastic tubular container, comprising a heating head which has a cross-section corresponding to a shape of the tubular container and can be coaxially inserted inside the open end of the tubular container so as to contact the internal surface of the tubular container along a section of the tubular container to be softened internally, said heating head being provided internally with heating means; and means for pressing said section of the tubular container against the heating head, which is inserted inside the open end of the tubular container, during heating so that heat is transmitted from the heating head to the internal surface of the tubular container by means of direct-contact heat conduction, said pressing means releasing pressing engagement with the section of the tubular container to allow withdrawal of the heating head therefrom upon completion of the heating.

2. Heating device according to claim 1, wherein said pressing means includes a rigid annular body kept fixed coaxially to the end of the container undergoing heating and provided with ducts respectively for supplying and discharging a fluid supplied under pressure, said ducts emerging in an annular seat accommodating a sheath made of elastically yielding material shaped so as to be able to be held against the annular body by counter-plates integral with the body itself so that the introduction of a fluid under pressure into the annular seat causes radial expansion of the sheath in the direction of the longitudinal axis of the tube which is thus compressed around the heating head.

3. Heating device according to claim 1, characterized in that said pressing means consist of at least one pair of jaws mounted on arms rotating about an axis fixed with respect to the longitudinal axis of the container.

4. Heating device according to claim 1, wherein an end part of said heating head is formed by means of interchangeable threaded rings which have different external diameters and can be coupled to the end of the heating head by means of a female thread cooperating with a corresponding thread formed on a stud of reduced diameter coaxially projecting from the head.

5. Heating device according to claim 1, 2 or 4, wherein at least one through-duct is formed coaxially with said cylindrical body, said through-duct being suitable for allowing venting of the air contained in a space between a product contained in the container and the heating head when the heating head is introduced into the container and when an inert gas is introduced, under pressure, into aid space.

6. Heating device according to claim 1, characterized in that the end of the head which is to be inserted into the tube consists of circle segments each of which has the resistance passing through it in the axial direction, said circle segments being movable in the radial direction by the thrusting action of a conical spigot which can in turn be actuated in the axial direction via corresponding means and which opposes the action of elastic means associated with the circle segments themselves.

7. Heating device according to claim 1, wherein said heating means include electrical resistance.

8. A device for heating an internal surface of an open end of a plastic tubular container, comprising a heating head which has a cross-section corresponding to a shape of the tubular container and can be coaxially inserted inside the open end of the tubular container so as to contact the internal surface of the tubular container along a section of the tubular container to be softened internally, said heating head being provided internally with electric heating resistance; and means for pressing said section of the tubular container against the heating head during heating so that heat is transmitted from the heating head to the internal surface of the tubular container by means of direct-contact heat conduction, wherein said pressing means includes a rigid annular body kept fixed coaxially to the end of the container undergoing heating and provided with ducts respectively for supplying and discharging a fluid supplied under pressure, said ducts emerging in an annular seat accommodating a sheath made of elastically yielding material shaped so as to be able to be held against the annular body by counter-plates integral with the body itself so that the introduction of a fluid under pressure into the annular seat causes radial expansion of the sheath in the direction of the longitudinal axis of the tube which is thus compressed around the heating head.

9. The heating device according to claim 8, wherein the end part of said heating head is capable of centering the internal surface of said section of the container and is formed by means of interchangeable threaded rings which have different external diameters and can be coupled to the end of the heating head by means of a female thread cooperating with a corresponding thread formed on a stud of reduced diameter coaxially projecting from the head.

10. The heating device according to claim 8, wherein at least one through-duct is formed coaxially with said cylindrical body, said through-duct being suitable for allowing venting of the air within a space between a product contained in the container and the head when the head is introduced into the container, and when an insert gas is introduced, under pressure, into said space.

\* \* \* \* \*